United States Patent [19]
Anderson et al.

[11] 3,812,881
[45] May 28, 1974

[54] FLUID RESPONSIVE CONTROL VALVES
[75] Inventors: Ernest David Anderson,
Narragansett; Larry Clyde Cowan,
Saunderstown, both of R.I.
[73] Assignee: Leesona Corporation, Cranston, R.I.
[22] Filed: Apr. 9, 1973
[21] Appl. No.: 349,451

[52] U.S. Cl. .......................................... 137/596.14
[51] Int. Cl. ............................................ F16k 11/10
[58] Field of Search......... 137/596.14, 596.15, 81.5,
137/596, 608, 609, 610, 829, 830; 235/201

[56] References Cited
UNITED STATES PATENTS
2,911,005  11/1959  Adelson .................... 137/596.15
3,080,887   3/1963  Brandenberg ............. 137/596.14
3,322,148   5/1967  Rochte ....................... 137/596.14

OTHER PUBLICATIONS
IBM Technical Disclosure Bulletin, Vol. 7, No. 4, Sept., 1964, pp. 295–296 "Pneumatically Controlled Logic Circuits" by M. Noll & R. Norwood.

*Primary Examiner*—Henry T. Klinksiek
*Assistant Examiner*—Robert J. Miller
*Attorney, Agent, or Firm*—Albert P. Davis; Burnett W. Norton

[57] ABSTRACT

Fluid operated devices such as pneumatic or hydraulic rams are controlled by multiple-flow valve apparatus operable from momentary fluid trigger pulses to initiate both fluid power drive and exhaust functions. Thus a fluid pulse triggered bistable state fluid path logic control element controls in a logic network at least one pair of slave valves which respectively convey fluid under pressure from a source to an output channel and exhaust the output channel in response to the state of the logic element.

The logic elements and valves comprise a compartment with a diaphragm movable into opposing chambers in response to fluid pressures in contact therewith to open or close fluid flow paths through at least one chamber.

Accordingly, a piston may be reciprocated at will or other load devices may be operated from steady state or continuing fluid paths controlled by momentary fluid pulses either randomly or cyclically in a simple efficient fluid controlled valve arrangement of interconnected fluid logic elements.

7 Claims, 1 Drawing Figure

PATENTED MAY 28 1974 3,812,881
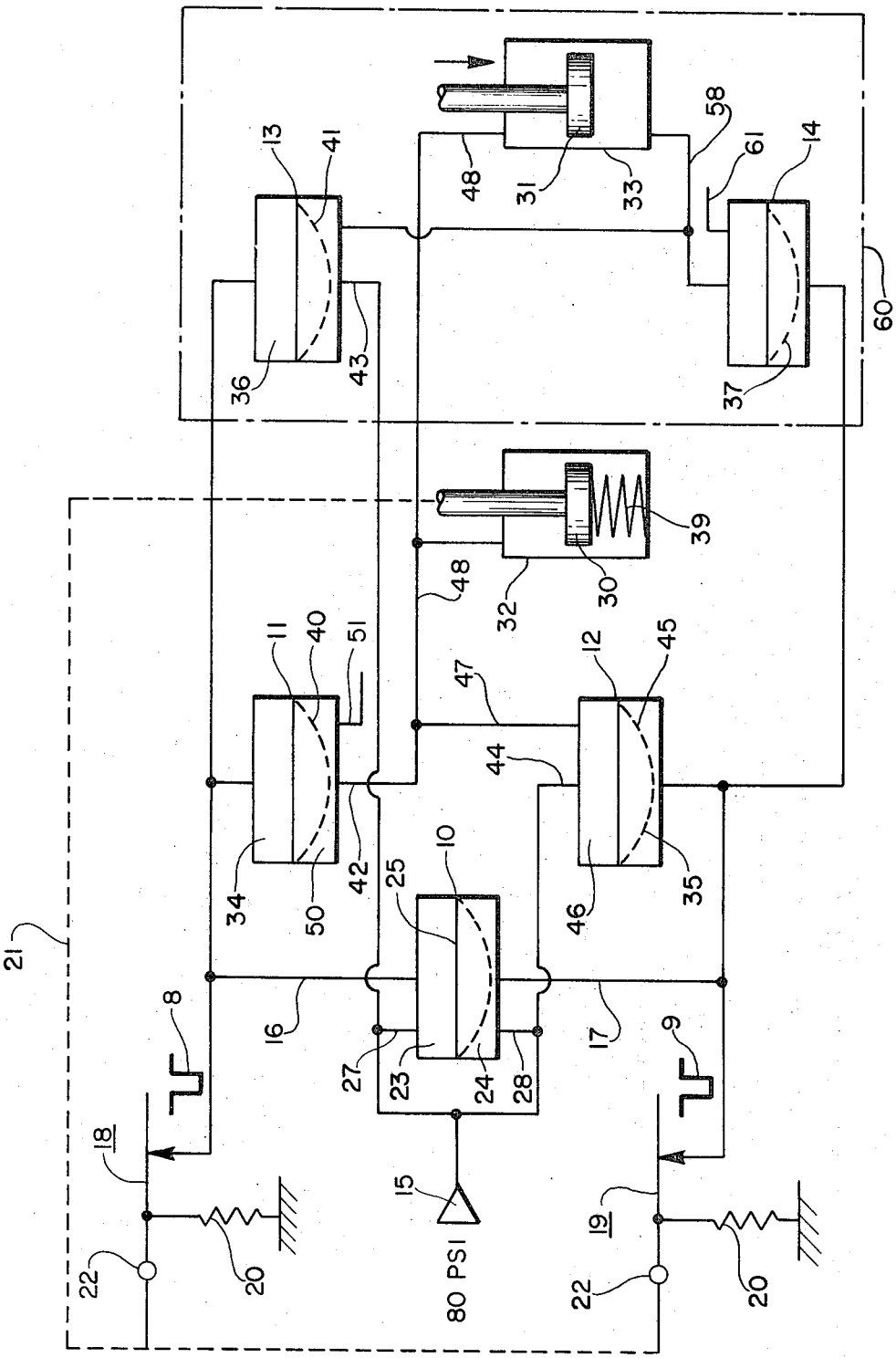

FLUID RESPONSIVE CONTROL VALVES

This invention relates to fluid responsive control valves and more specifically it relates to valves controlling both fluid pressure and fluid exhaust in at least one fluid channel in response to control logic patterns triggered by momentary fluid pulses.

Rather complex logic control sequences are required in order to drive fluid operated pistons through cyclic patterns. It has been necessary in some prior art drive networks to use complex networks of fluid logic elements to perform the pressure and exhaust cycle functions for a cylinder drive line, for example.

In addition, many control valves for such functions will not respond to momentarily actuated control signals, and therefore perform only the function of following a logic control signal derived from mechanisms or manual control. Even if controlled momentarily many valves will not respond to fluid pulses so that cumbersome interface devices are often necessary.

It is therefore a general object of the invention to provide improved and simplified control valves.

A more specific object of the invention is to provide fluid actuated valves for controlling both fluid power and fluid exhaust control of an output channel.

Therefore in accordance with the invention, an array of fluid responsive logic elements is coupled in a control valve arrangement for establishing upon command bidirectional flow in a controlled fluid channel. Thus, fluid power into and fluid exhaust from a reciprocating cylinder is controlled at will from momentary fluid trigger pulses.

The logic network comprises a trigger pulse operated bistable state device and at least one pair of slave valves operable to control fluid flow paths in response to the stored state. Accordingly a first momentary pulse provided by opening a fluid line will cause fluid to flow from a source to power a piston stroke in one direction, for example, and a second momentary pulse will reverse the power to or exhaust from the piston for a stroke in the opposite direction.

Further objectives, advantages and features of the invention will be found throughout the following more detailed description of the invention and a preferred embodiment thereof shown in logic circuit diagram form in the accompanying drawing.

With reference now to the drawing, a bistable state fluid logic element 10 is employed, of the nature described in the pending application of the same assignee, Ser. No. 179,844 filed Sept. 13, 1971 now matured into U.S. Pat. No. 3,789,864 issued 2/5/74 upon Ser. No. 349,635 a continuation-in-part. Thus bistable state logic element 10 is coupled to control one or two pairs of slave valves comprising respectively flow control logic gates 11, 12 and 13, 14. The bistable state element 10 establishes in response to momentary fluid trigger pulses 8 or 9 a steady state control condition which comprises a fluid flow path from a fluid source 15 of air at 80 psi pressure for example, to either of two designated output paths 16, 17.

The trigger pulses are obtained at respective valves 18, 19 which may be opened manually or mechanically by rotating about pivot 22 against the bias of closing springs 20 as signified by dotted line 21, to vent and reduce the source pressure at either path 16 or 17 momentarily, thereby changing the stable stored state of logic element 10.

The elements are shown schematically to signify a generally closed chamber with two inner compartments such as 23, 24 separated by a diaphragm 25 which can be moved into either compartment to control fluid flow paths by blocking one of the two output leads 16 or 17 for example. As shown in phantom, the composite pressure and area total in compartment 24 is reduced because of contact with the output port to line 17 so that the diaphragm in either deflected position will maintain its position and closure of one of the two fluid flow paths until reversed by a further trigger pulse 8 or 9. Thus, if the diaphragm 25 is in the phantom position and trigger pulse 8 is initiated by opening valve 18 to reduce pressure in compartment 23, the diaphragm will snap over to open path 17 and close path 16 diverting flow of fluid from source 15 from one stable flow path to another without requiring constant leakage from valve 18.

Furthermore, the valve arrangement is efficient since the only flow of fluid from the source 15 required other than a momentary trigger control pulse to initiate the logic switching sequence is that required to operate load devices such as pistons 30, 31 within the respective cylinders 32, 33. This results since each logic valve 11, 12, 13, 14 is a slave unit with its diaphragm controlled by pressure in a corresponding compartment 34, 35, 36, 37 without a fluid flow path therethrough, to thereby follow the state of the bistable element 10. Accordingly, if the bistable element 10 is in that state typified in phantom view, the high source pressure at outlet path 16 will cause diaphragm 40 and 41 in valve elements 11 and 13 to close corresponding fluid flow paths through inlet leads 42, 43. Conversely the lack of source pressure at outlet 17 will cause a lower pressure in compartment 35 of valve element 12 to thereby cause source pressure at inlet lead 44 to place diaphragm 45 in the phantom position and permit a fluid flow path through compartment 46 into outlet lead 47. Thus fluid power from source 15 is conveyed into cylinder 32 by output channel lead 48 to compress spring 39 which returns the piston 30 when the bistable state device 10 reverses to reverse valve 11 and vent output channel line 48 through compartment 50 and vent 51.

Therefore bistable element 10 with the pair of slave valve elements 11, 12 constitutes a three way valve arrangement which controls both power fluid flow and release or exhaust in output channel 48 at will by means of momentary trigger pulses 8 and 9. If automatic cyclic oscillation of piston 30 is desired, trigger valves 18 and 19 may be controlled by detent mechanisms respectively at each end of the piston 30 stroke as schematically indicated by dotted line 21. Otherwise, the trigger valves may be operated by other mechanisms or manually to control the piston 30 stroke in either direction at will at times corresponding to other system functions.

Similarly a further output channel 58 may be controlled by a further pair of slave valves 13, 14 so that alternately one output channel conveys fluid under pressure from the source to constitute a four way valve arrangement. Thus the section shown inside block 60 may be used to control a piston 31 reciprocating inside cylinder 33 under control of fluid flow by the valve arrangement. Thus each pair of valves 11, 12 or 13, 14 is connected to a respective output channel 48 and 58 for control of the fluid flow pressure and direction to provide power to and exhaust from the cylinder 33 and piston 31. Each fluid output channel is thus connected for control by one slave valve element of each pair for respective exhaust and power control as controlled from the state of the bistable element 10. As shown therefore by the phantom diaphragm positions, exhaust pressure from cylinder 33 at lead 58 will cause diaphragm 37 to open vent 61 while fluid under pressure from source 15 flows through compartment 46 of element 12 into cylinder 33 by channel 48 to push piston 31 downwardly as shown by the arrow. Conversely as bistable state element 10 reverses, slave units 11 to 14 follow to cause the piston stroke to reverse.

During operation of the valve to control work functions to a load, little control power is necessary for operating the valve logic, and the logic network is simple. A significant advantage attained by this valve arrangement is that the logic system requires only a single source 15 at a single pressure which supplies to the load devices 30, 31 or the like full source pressure without reduction or losses in bleeds, chokes, resistors or complex logic manipulations. Trigger control pulses simply require a momentary leakage or venting to reduce source pressure at a selected system logic point. Accordingly, an efficient and improved fluid responsive control valve arrangement is afforded by this invention, whose scope and nature is defined in particularity by those features of novelty set forth in the appended claims.

What is claimed is:

1. A valve arrangement for controlling fluid pressure and fluid exhaust flow in at least one output channel in response to momentary fluid pulse trigger signals comprising in combination, a source of fluid under pressure, a bistable state fluid logic element having a diaphragm movable within two opposed chambers to close flow paths therethrough in response to fluid pressure differences on corresponding sides thereof, means producing said trigger pulses to reduce pressure on one side of said diaphragm thereby to direct the fluid to alternate ones of two paths through respective ones of said chambers, means providing closed fluid flow channels for each of said two paths including said momentary trigger pulse means in each path constituting the sole fluid outlet from said paths, a first slave valve element coupled in one said path to follow the state of said logic element and control a fluid flow path from said source, a second slave valve element coupled in the other said path to follow the state of said logic element and control a release path for fluid, and means coupling said output channel to both said slave valves to thereby alternately receive fluid under pressure or be vented in response to the slave valves as the state of said bistable logic element changes.

2. An arrangement as defined in claim 1 having a second output channel coupled similarly to two further slave valves controlled by said bistable element, said valves having fluid flow paths connected so that alternately one output channel exhausts fluid while the other output channel conveys fluid under pressure from said source.

3. An arrangement as defined in claim 1 wherein all said elements comprise fluid logical control means having a diaphragm movable within two opposed chambers in response to fluid pressure on corresponding sides thereof, and having a fluid flow path closed by said diaphragm when moved into at least one chamber.

4. An arrangement as defined in claim 3 wherein said trigger means comprises means reducing fluid pressure in a selected one of said two chambers of the bistable element.

5. An arrangement as defined in claim 1 wherein said bistable state element is a device having a compartment divided in two chambers having separated fluid flow paths therethrough by a diaphragm movable by fluid pressure in said chambers to block one of said fluid flow paths.

6. An arrangement as defined in claim 5 wherein each said slave valve is a device having a compartment divided by a diaphragm into two chambers, only one having a fluid flow path therethrough opened and closed by movement of said diaphragm, and having a slave control fluid connection path between each said chamber without a fluid flow path and said bistable element constituting means for causing said fluid flow path of the slave valves to open and close in response to the changes of state of said bistable element.

7. An arrangement as defined in claim 6 including two pairs of said slave valves, each pair being connected to a separate output channel, and wherein said slave control fluid paths are connected between each one of said flow paths of said bistable element to one slave valve of each pair.

* * * * *